(12) United States Patent
Yoshimura

(10) Patent No.: US 6,463,172 B1
(45) Date of Patent: Oct. 8, 2002

(54) IMAGE PROCESSING METHOD AND APPARATUS

(75) Inventor: Megumi Yoshimura, Ryugasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/255,866

(22) Filed: Feb. 23, 1999

(30) Foreign Application Priority Data

Feb. 27, 1998 (JP) .......................................... 10-047419

(51) Int. Cl.$^7$ ................................................ G06K 9/00
(52) U.S. Cl. ........................ 382/162; 382/284; 358/540
(58) Field of Search ................................ 382/284, 294, 382/154, 162, 167–169; 358/450, 540, 462, 519, 518, 298, 522, 444, 448; 345/634, 597, 589, 629–631, 632, 638; 348/584–590, 596–599

(56) References Cited

U.S. PATENT DOCUMENTS

| | | | | |
|---|---|---|---|---|
| 4,903,145 A | | 2/1990 | Funada ........................ 358/462 |
| 4,931,864 A | | 6/1990 | Kawamura et al. .......... 358/519 |
| 5,185,808 A | * | 2/1993 | Cok ............................. 382/284 |
| 5,414,529 A | * | 5/1995 | Terada et al. ................ 358/448 |
| 5,465,163 A | * | 11/1995 | Yoshihara et al. ........... 358/444 |
| 5,467,196 A | | 11/1995 | Fukushima et al. ......... 358/298 |
| 5,680,150 A | * | 10/1997 | Shimizu et al. .............. 345/634 |
| 5,696,840 A | | 12/1997 | Usami ......................... 382/167 |
| 5,982,951 A | * | 11/1999 | Katayama et al. ........... 382/284 |
| 6,072,914 A | * | 6/2000 | Mikuni ........................ 382/284 |
| 6,215,914 B1 | * | 4/2001 | Nakamura et al. .......... 382/284 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

When performing image synthesis, in which a plurality of images having different color tones are combined, or when converting the contrast of an image, the prior art is such that a user must convert pixel levels manually. Consequently, it is required that the user have thorough knowledge of the constitution of the image data to undergo the level conversion and of image processing techniques in general. This means that the conversion cannot be performed by anyone in simple fashion. In accordance with the present invention, a conversion table is created automatically based upon the color distribution of first image data in such a manner that the color tone of second image data is made to approach that of the first image data, and the second image data resulting from a pixel level conversion by this conversion table is combined with the first image data, whereby there is obtained a natural composite image. In another aspect, an appropriate contrast conversion can be performed with ease by performing a pixel level conversion in accordance with a conversion table created based upon a pixel level distribution of image data.

11 Claims, 12 Drawing Sheets

IMAGE PROCESSING METHOD AND APPARATUS

BACKGROUND OF THE INVENTION

This invention relates to an image processing method and apparatus and, more particularly, to an image processing method and apparatus for performing a level conversion of image data, by way of example.

When two images having different color tones are combined in an image processing apparatus according to the prior art, the result of the combination will be unnatural owing to the different tones if the combination is performed as is. When such images are combined, therefore, the user manually subjects the R, G, B level values or other levels of one image to a conversion and adjustment and then executes synthesis processing, whereby a more natural composite image can be obtained.

Further, when it is desired to make a photographic image lacking vividness more vivid and sharp in the conventional image processing apparatus, the user manually subjects the R, G, B level values or other levels of the photographic image to a conversion and adjustment, thereby making it possible to convert the image to one having a desired contrast.

Thus, by subjecting image data to be operated upon to a conversion of the pixel level at will, the user can obtain the desired image data.

However, since the pixel level conversion is carried out manually in the conventional image processing apparatus described above, it is required that the user have thorough knowledge of the constitution and features of the image data to undergo the level conversion and of image processing techniques in general. This means that the level conversion operation for obtaining a desired image cannot be performed by anyone in simple fashion.

SUMMARY OF THE INVENTION

Accordingly, it is an object of the present invention to provide an image forming method and apparatus through which the color tone of image data can easily be made to approach that of any image data.

According to the present invention, the foregoing object is attained by providing an image processing method comprising: an analysis step of analyzing a pixel level distribution in first image data; a conversion condition generating step of generating conversion conditions for second image data based upon results of analysis performed at the analysis step; and a conversion step of converting the second image data based upon the conversion conditions.

As a result, the color tone of the second image data can be made to approach that of the first image data with facility.

It is another object of the present invention to provide an image forming method and apparatus through which natural synthesis of images is possible.

According to the present invention, the foregoing object is attained by providing an image processing apparatus further comprising a synthesis step of combining the second image data, which has been obtained by the conversion, with the first image data.

As a result, it is possible to achieve natural synthesis of the second image data and first image data.

It is another object of the present invention to provide an image forming method and apparatus that make it easy to perform appropriate conversion of image data contrast.

According to the present invention, the foregoing object is attained by providing an image processing method comprising a sensing step of sensing a highlight area and a dark area of image data; a conversion condition generating step of generating conversion conditions for the image data based upon the highlight area, dark area and a predetermined value; and a conversion step of converting the image data based upon the conversion conditions.

As a result, it is possible to easily convert the contrast of image data appropriately.

The invention is particularly advantageous since image data can be subjected to an appropriate level conversion automatically.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<First Embodiment>

This embodiment is characterized in that after an appropriate level conversion is performed automatically in regard to two color images displayed on a display unit, for example, in such a manner that the color tone of the image data of one image (which shall be referred to as a "target image") is made to conform to the color tone of the other image (which shall be referred to as a "reference image") in response to a designation made by the user via a pointing device, the two images are combined.

Figure 1:
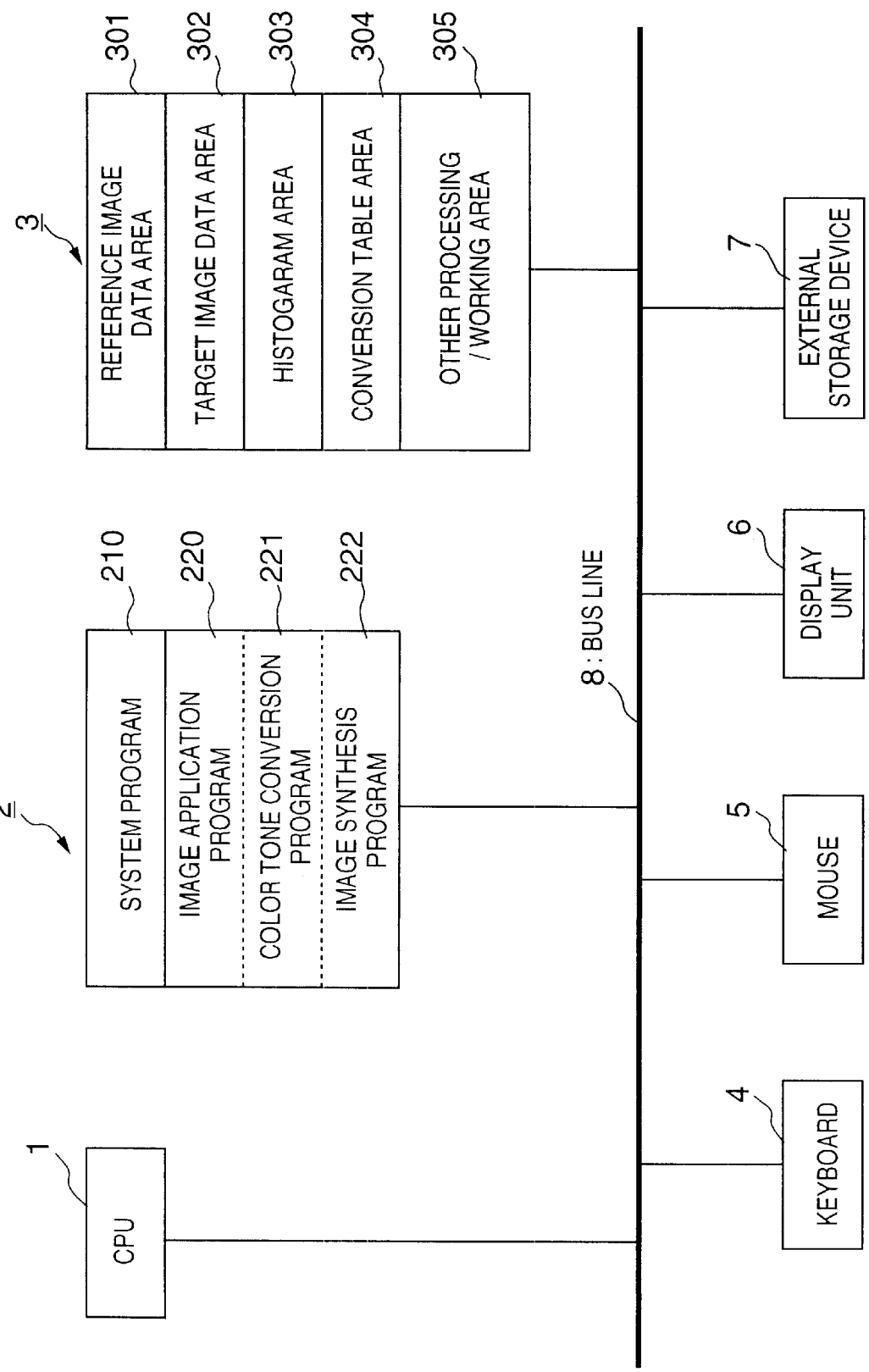
FIG. 1 is a block diagram showing the general construction of an image processing apparatus according to an embodiment of the present invention.

FIG. 1 is a block diagram showing the general construction of an image processing apparatus according to a first embodiment of the present invention. The image processing apparatus according to this embodiment includes a CPU (central processing unit) 1, a ROM (read-only memory) 2, a RAM (random access memory) 3, a keyboard 4, a mouse 5, a display unit 6 and an external storage device 7. These components are interconnected by a bus line 8.

The CPU 1, which is in the form of a microprocessor, for example, controls the operation of the foregoing components. The ROM 2 stores a system program 210 and an image application program 220, which is for executing various image processing. The image application program 220 includes a color tone conversion program 221, which is a characterizing feature of the present invention, and an image synthesis program 222. The RAM 3 includes a reference image data area 301 for storing an image serving as a reference for color tone, a target image data area 302 for storing a target image whose color tone is to be converted, a histogram area 303 for storing a histogram of the reference image, a conversion table area 304 which stores a conversion table for converting the color tone of the target image, and an area 305 used for other processing and as a work area.

In this embodiment, it is assumed that the image data stored in the reference image data area 301 and target image data area 302 is read in from the external storage device 7. Further, variables such as distributions SUM_R, SUM_G, SUM_B and a maximum distribution MAX, which are described later, are provided in the area 305. In this embodiment, both the reference image data and target image data will be described as being RGB image data of eight bits for each of R, G, and B, as a result of which there are 24 bits of information for one pixel.

The keyboard 4 allows the user to input data such as characters, numerals and symbols and to issue various instructions to the CPU 1. The mouse 5 is used to click on (designate) various items of information displayed on the display unit 6, thereby issuing various instructions to the CPU 1. A device such as a trackball, pen or touch-sensitive panel may be substituted for the mouse 5 as long as the substituted device is a so-called pointing device. The display unit 6, which is constituted by an LCD or the like, displays various data in response to control performed by the CPU 1. The external storage device 7 comprises a medium such as a floppy disk, CD-ROM or hard disk. Various data that has been read out of the external storage device 7 under the control of the CPU 1 is developed in the RAM 3 via the bus line 8.

It should be noted that the system program 210, color tone conversion program 221 and image synthesis program 222 in the ROM 2 may be stored in the external storage device 7, such as a hard disk. In this case these programs would be read out and then expanded in the RAM 3 and executed by the CPU 1.

Image synthesis processing in the image processing apparatus constructed as set forth above will now be described in detail.

First, the principles of color tone conversion according to this embodiment will be described with reference to FIGS. 2 and 3.

Figure 2A:
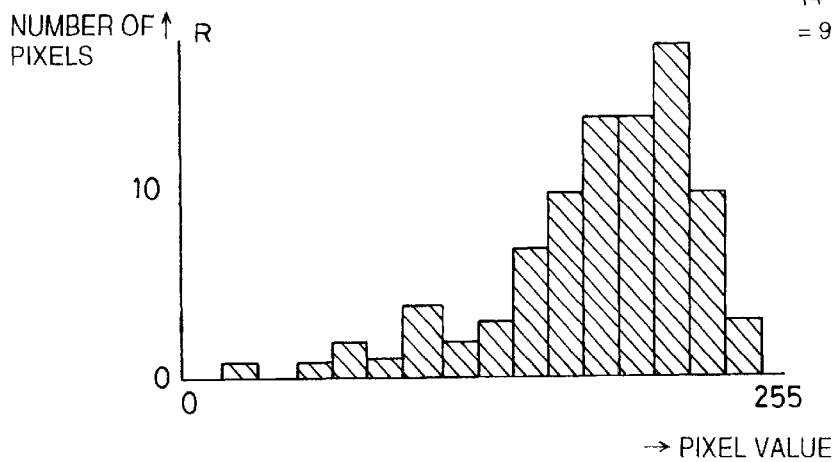
FIGS. 2A–2C are diagrams showing examples of histograms of a reference image in this embodiment.
Figure 2B:
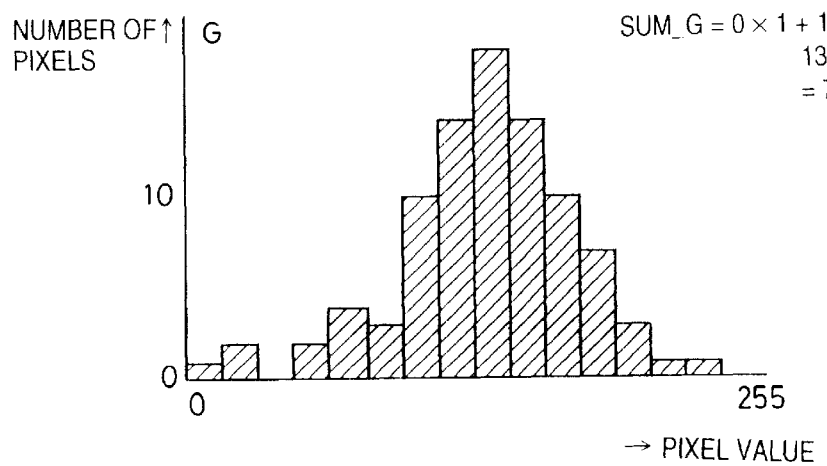
Figure 2C:
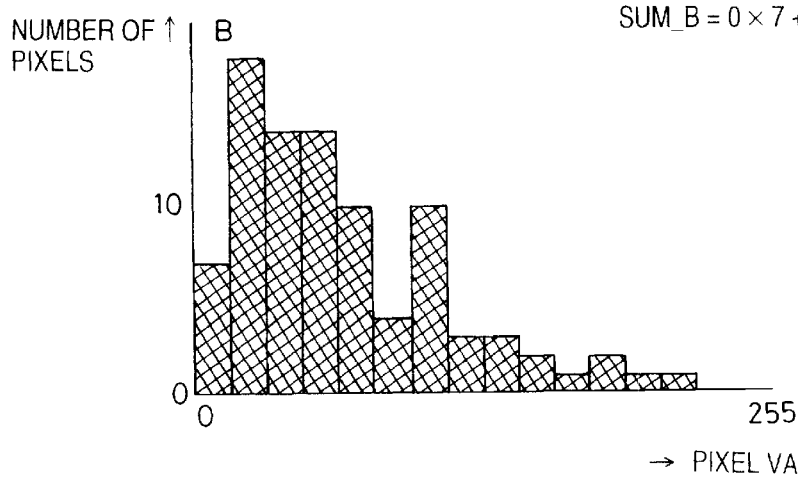

FIGS. 2A–2C illustrate examples of histograms of a reference image created in this embodiment. These histograms are obtained by the CPU 1 in dependence upon reference image data and are stored in the histogram area 303 of RAM 3. Since the image data in this embodiment is composed of eight bits for each of R, G and B, the data has values of 256 levels, namely 0 to 255, for each color. However, in order to simplify the description of the histogram examples shown in FIGS. 2A–2C, the 256 levels are divided into 16 stages and the number of pixels per stage is indicated. In FIGS. 2A–2C, (a) is a histogram of the R (red) component. This histogram indicates that among all R-component pixels that make up the reference image, pixels having pixel values (levels 0 to 15) in the 0th stage are zero in number and pixels having pixel values (levels 16 to 31) in the 1st stage are one in number. FIGS. 2(b) and (c) similarly illustrate histograms of the G (green) and B (blue) components, respectively.

Figure 3:
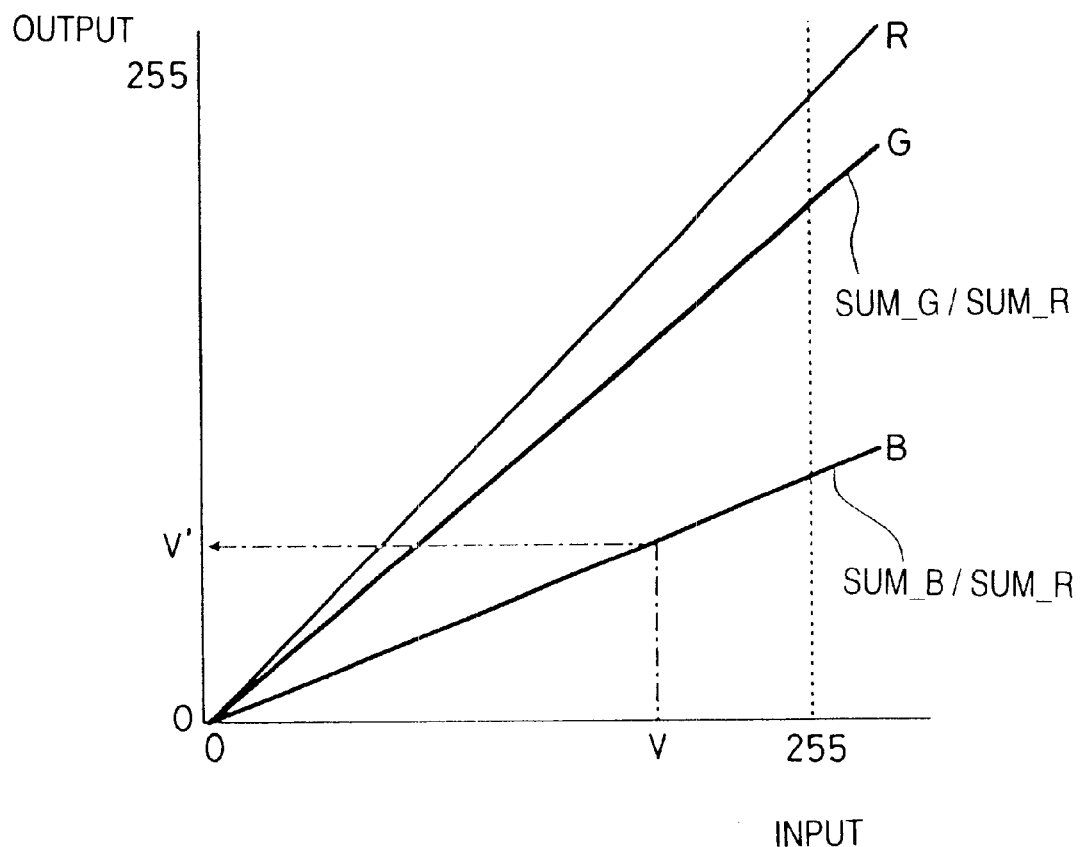
FIG. 3 is a diagram showing an example of conversion tables in this embodiment.

FIG. 3 shows an example of conversion tables according to this embodiment. These conversion tables are obtained by the CPU 1 in dependence upon reference image data and are stored in the conversion table area 304 of RAM 3. In this embodiment, an input pixel value of a target image is converted for every color component in accordance with the conversion tables shown in FIG. 3. The conversion tables are created in the following manner: First, on the basis of the histograms of the reference image shown in FIGS. 2A–2C, the sum totals of the products of the pixel values and numbers of pixels [i.e., (pixel value)×(number of pixels)] for each of the components R, G, B are obtained as the distributions SUM_R, SUM_G, SUM_B, respectively. Then, letting the maximum value, i.e., the maximum distribution, among these three distributions be represented by SUM_R, for example, a conversion table for the B component of the target image data is created in such a manner that a pixel value V' resulting from conversion of a pixel whose pixel value is V will be represented by $$V'=V \times SUM\_B/SUM\_R$$

Similarly, in regard to the G component, a conversion table for the G component is so as to obtain $$V'=V \times SUM\_G/SUM\_R$$

More specifically, on the basis of the histograms of the reference image, the inclination of each color in the reference image data, for example the fact that there are few B components and many R components, is recognized, and the conversion tables are created so as to reflect this inclination. Accordingly, as a result of subjecting the target image data to a color tone conversion using these conversion tables, it is possible to make the conversion in such a manner that the B components are reduced to a quantity similar to that of the reference image data. This color tone of the target image thus can be made to approach that of the reference image.

Image synthesis processing according to this embodiment will now be described in detail with reference to the flowchart of FIG. 4. It should be noted that various initialization processing executed when the image application program 220, etc., is started up is omitted from this flowchart.

When the image application program 220 is started up by the CPU 1 in this embodiment, the image application program 220, the color tone conversion program 221 for converting color tone and the image synthesis program 222 for combining images are read out of the ROM 2. However, in order not to make wasteful use of memory, it is preferred that the color tone conversion program 221 and image synthesis program 222 be read out at such time that color conversion processing and image synthesis processing has been started from the image application program 220.

Further, though various information and storage areas necessary when the color conversion processing of this embodiment is executed are acquired in the RAM 3, the reference image data area 301, target image data area 302, histogram area 303 and conversion table area 304 may be acquired when the apparatus is started up. However, it is preferred that these areas be acquired when each is required. By adopting this expedient, memory areas are not used wastefully. This is useful in a case where other processing using memory areas is executed concurrently. Likewise, the area 305 used for other processing and as a work area in the RAM 3 may be acquired in advance when the image application program 220 is started up or when this storage area becomes necessary.

Figure 4:
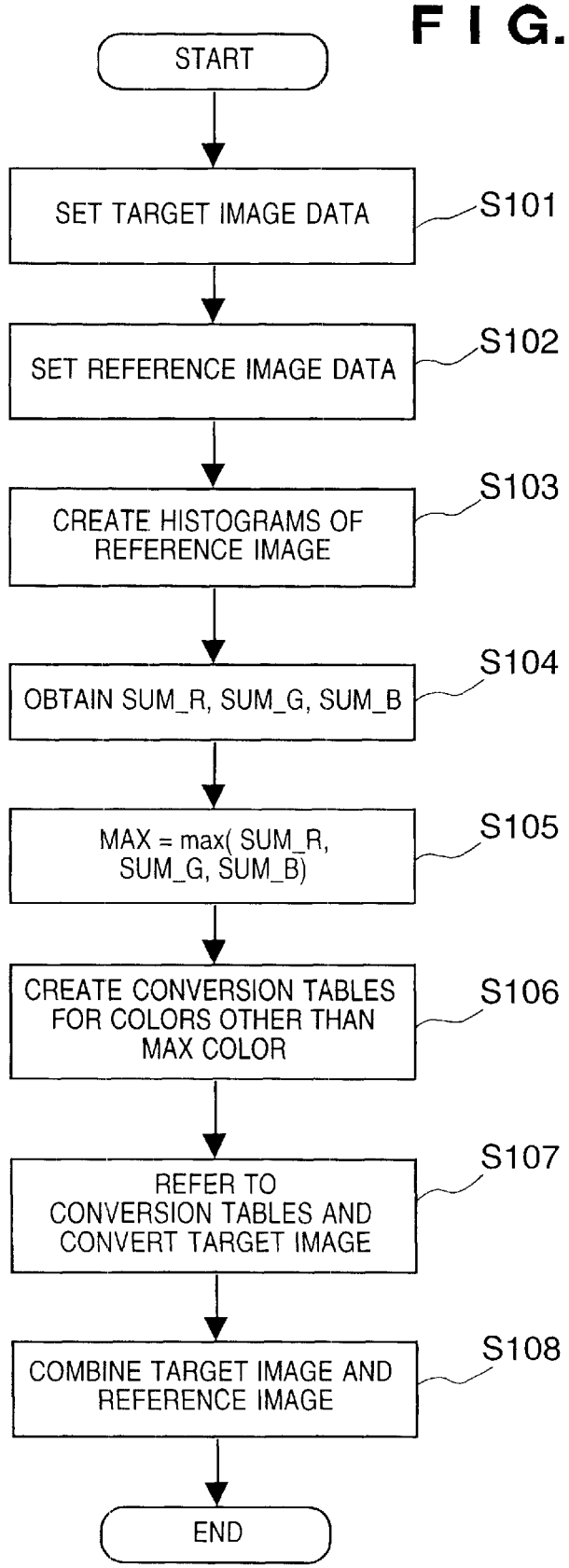
FIG. 4 is a flowchart showing color tone conversion processing in this embodiment.

In the flowchart of FIG. 4, image data (target image data) whose color tone is desired to be converted is called to the target image data area 302 at step S101. When the start of color tone conversion processing based upon the color tone conversion program 221 is commanded in accordance with execution of the image application program 220, image data (reference image data) whose color tone is the reference is called to the reference image data area 301 at step S102. It is of course permissible to reverse the order of steps S101 and S102, i.e., to start the color tone conversion processing after the reference image data is called. In either case, when color tone conversion processing is executed in this embodiment, the image data that has been called to the reference image data area 301 and target image data area 302 is stored to establish the necessary information.

Executing steps S101 and S102 described above specifies the two images that are to be combined.

It should be noted that the calling of the target image data and reference image data in this embodiment may be performed by displaying a plurality of images represented by image data stored on the external storage device 7, for example, on the display unit 6 and having the user select the desired images from these displayed images by the keyboard 4 or mouse 5. Naturally, file names may be entered directly using the keyboard.

When color tone conversion processing has thus started, histograms of the reference image data are created at step S103. These histograms are obtained by evaluating the values (0 to 255) of all pixels of each of R, G and B and finally counting the numbers of pixels of each and every pixel value, as shown in FIGS. 2A–2C.

This is followed by step S104, at which the values of (pixel value)×(number of pixels) are obtained for all pixel values and the sum totals of these products are found as the distributions SUM_R, SUM_G, SUM_B for R, G, B, respectively. For example, in the example of R shown at (a) of FIGS. 2A–2C (where the pixel values are assumed to be 0 to 16 for the sake of convenience), the number of pixels of pixel value 0 is zero, the number of pixels of pixel value 1 is one, . . . and the number of pixels of pixel value 15 is three. Therefore, SUM_R is $$SUM\_R = 0 \times 0 + 1 \times 1 + \ldots + 14 \times 10 + 15 \times 3 = 983$$

Similarly, we have SUM_G=707 and SUM_B=328 in (b) and (c), respectively, of FIGS. 2A–2C.

Next, at step S105, the distribution among the distributions SUM_R, SUM_G, SUM_B obtained at step S104 having the largest value is decided upon as the maximum distribution MAX.

Conversion tables for the color components other than the color component for which MAX is indicated (the component having the largest distribution) are created at step S106. In the example of FIGS. 2A–2C, SUM_R is the maximum distribution and, hence, is adopted as MAX. Accordingly, conversion tables for the color components G, B are created. The conversion tables in this embodiment are obtained in accordance with the equation $$V' = V \times SUM\_X / MAX$$

where V represents a pixel value before conversion, V' a pixel value after conversion and SUM_X the distribution of a color component other than that having the maximum distribution. In the example of FIGS. 2A–2C, SUM_X corresponds to SUM_G and SUM_B regarding the G and B components, respectively. Examples of the conversion tables thus obtained are illustrated as graphs in FIG. 3. In FIG. 3, the conversion table of the G component has a slope SUM_G/SUM_R and that of the B component has a slope SUM_B/SUM_R.

In this embodiment, a conversion table is not created in regard to the R component, which is the component having the maximum distribution, because the pixel values of this component are not converted. That is, the slope of the graph of the R component in FIGS. 2A–2C is 1. Naturally, in a case where some conversion is performed even in regard to a color component for which the distribution is maximum, a suitable conversion table need only be created.

Conversion of pixel values is actually performed at step S107 in accordance with the conversion tables created at step S106. Here the pixel values of all pixels of the color components of the target image data for which conversion tables have been created (i.e., the G and B components in the example of FIG. 2) are rewritten while reference is made to the conversion tables. In other words, in a case where the values of R, G and B of a pixel of interest are, e.g., 6, 10 and 13, respectively, the pixel value of R is not rewritten because a conversion table has not been created for this component. If the value V' after the conversion in regard to V=10 in the conversion table for G is V'=7, the value of G of the pixel of interest is rewritten to 7. Similarly, if the value V' after the conversion in regard to V=13 in the conversion table for B is V'=4, the value of B of the pixel of interest is rewritten to 4.

When all pixel values have thus been converted in accordance with the conversion tables, an image whose color tone is close to that of the reference image is obtained. In other words, the color tone of the target image can be made to approach that of the reference image.

The target image obtained by the color tone conversion and the reference image are combined at step S108 by starting up the image synthesis program by the image application program 220. Since the color tones of the target image and reference image are near to each other in this case, a more natural composite image is obtained.

It should be noted that the image synthesis processing at step S108 need be performed only as needed. For example, it is possible as a matter of course for the target image obtained by the color tone conversion to be saved in the area 305 beforehand and combined with another image specified by the user or combined with two or more images which include a reference image, by way of example.

<Modification of First Embodiment>

Figure 5:
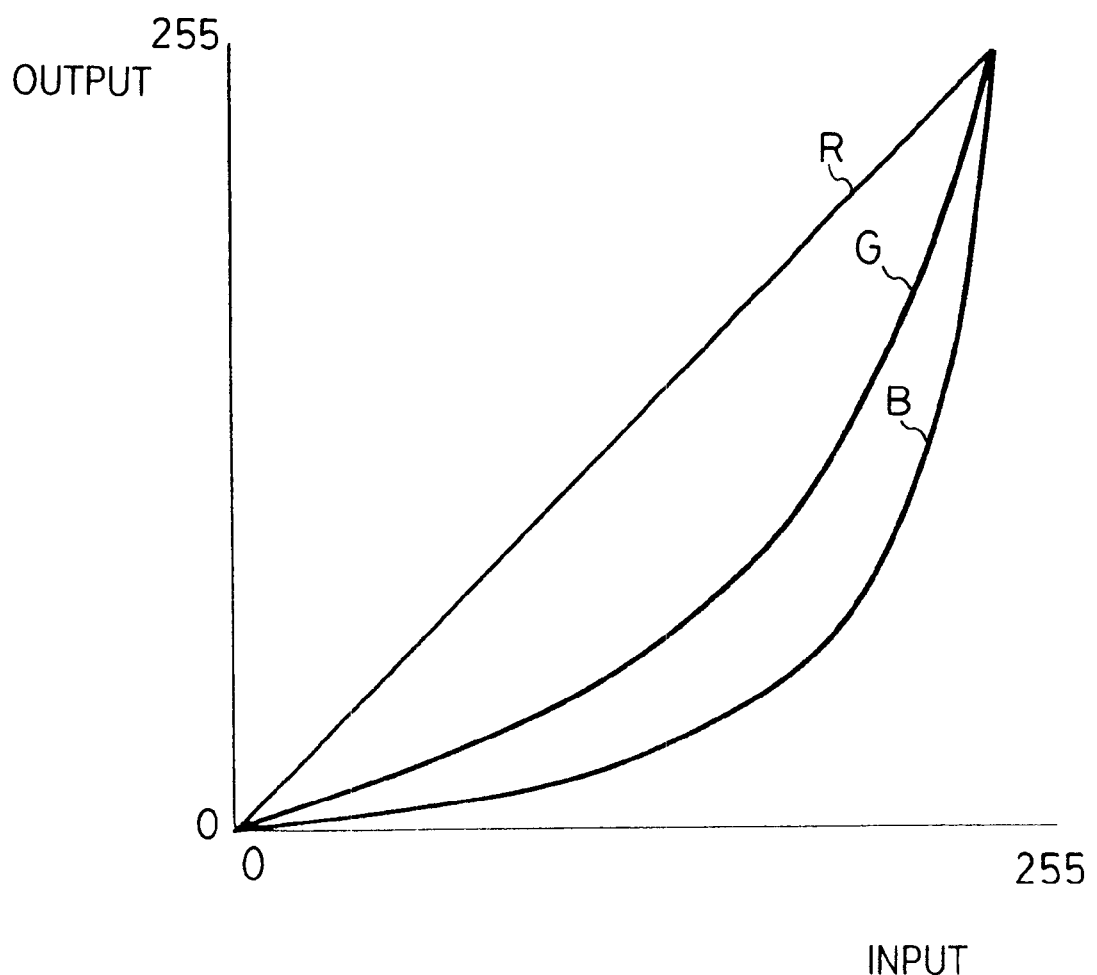
FIG. 5 is a diagram showing an example of conversion tables in this embodiment.

In the first embodiment, an example is described in which a conversion based upon a linear function, namely V'=V×SUM_X/MAX, is performed using conversion tables. However, this does not impose a limitation upon the present invention for it is also possible to create conversion tables using a non-linear function, such as by employing a gamma function. FIG. 5 illustrates examples of conversion tables based upon a gamma function. In accordance with the conversion tables shown in FIG. 5, no conversion is performed in regard to 0 and 255, which are the lowest and highest levels of a pixel value; only pixel values intermediate 0 and 255 are converted. Applying this technique makes it possible to obtain an effect in which the greater the components of R, G or B in terms of the input pixel values, the more the color tone thereof remains, so that color tone approaches that of the reference image more where the R, G or B components are fewer. In a case where the gamma function is used, the necessary parameter γ should be found from the distribution SUM_X of each color or the value of the maximum distribution MAX.

In this embodiment, color image data, which is similar to the target image data, composed of pixel levels of each and every color component is described as the reference image data, namely the data referred to in order to convert the color tone of the target image data. However, vector data of a color or a color table in which values representing colors have been written may serve as the data referred to in order to perform the color tone conversion. Similarly, the target data that is to undergo the color tone conversion is not limited to image data but may be data other than image data, such as vector data.

It is described that the reference image data and target image data in this embodiment are both read in from the external storage device 7. However, the reference image data may be incorporated in the color tone conversion program 221 or image synthesis program 222 or in an area of the ROM 2 in advance. If histograms of this reference image data and conversion tables are obtained beforehand and described in the color tone conversion program 221 in such case, then processing for generating the histograms and conversion tables need no longer be executed on each occasion. This makes processing at high speed possible.

Thus, in accordance with the first embodiment as described above, the color tone of a color image can be automatically converted to conform the color tone of any other color image. In addition, by combining these color images, it is possible to obtain a synthesized result having a more natural color tone.

<Second Embodiment>

A second embodiment according to the present invention will now be described.

The second embodiment is characterized in that a pixel level conversion is performed automatically so as to obtain an appropriate image data contrast.

Figure 6:
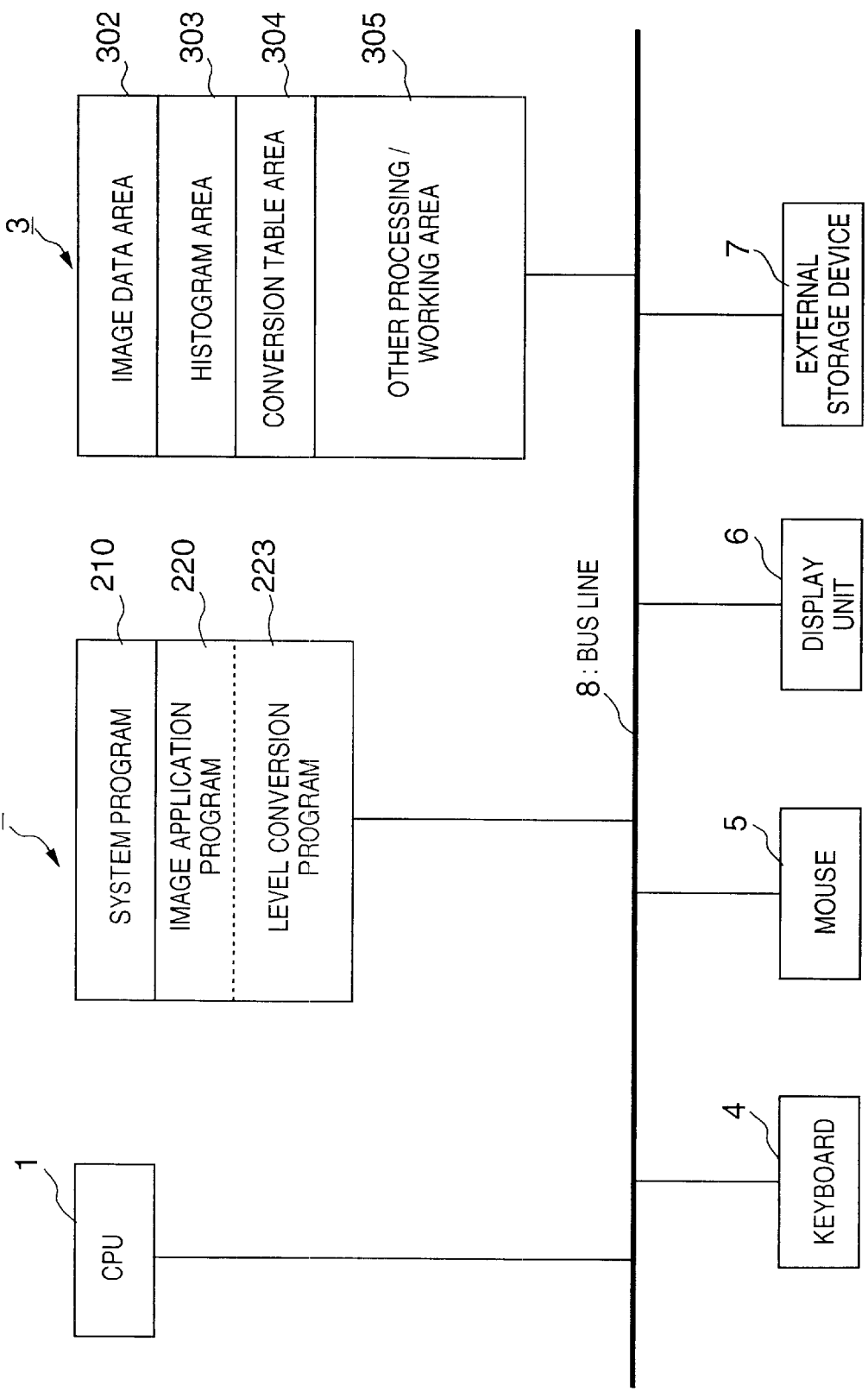
FIG. 6 is a block diagram showing the general construction of an image processing apparatus according to a second embodiment of the present invention.

FIG. 6 is a block diagram showing the general construction of an image processing apparatus according to the second embodiment of the present invention. Components in FIG. 6 identical with those of the first embodiment shown in FIG. 1 are designated by like reference characters and need not be described again.

In the second embodiment, the ROM 2 stores the system program 210 and the image application program 220 for executing various image processing. The image application program 220 includes a pixel level conversion program 223, which is a characterizing feature of this embodiment. The RAM 3 includes the image data area 302 for storing a target image whose color tone is to be converted, the histogram area 303 for storing a histogram of image data, the conversion table area 304 which stores a conversion table for converting the levels of the image data, and the area 305 used for other processing and as a work area.

In the second embodiment, it is assumed that the image data that is stored in the image data area 302 is read in from the external storage device 7. Further, variables such as α, β are acquired in the area 305. Further, in the second embodiment, the image data will be described as being RGB image data of eight bits for each of R, G, and B, as a result of which there are 24 bits of information for one pixel.

It should be noted that the system program 210 and pixel level conversion program 223 in the ROM 2 may be stored in the external storage device 7, such as a hard disk. In this case these programs would be read out and then expanded in the RAM 3 and executed by the CPU 1.

Pixel level conversion processing in the image processing apparatus construction as set forth above will now be described in detail.

Figure 7:
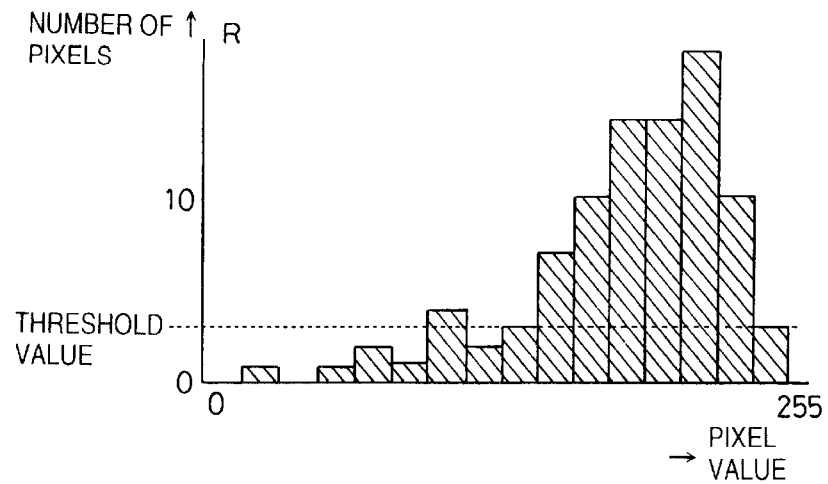
FIGS. 7A–7C are diagrams showing examples of histograms of a reference image in the second embodiment.

First, the principles of pixel level conversion according to the second embodiment will be described with reference to FIGS. 7 and 8.

In order to adjust the contrast level of image data in the second embodiment, histograms are obtained for respective ones of the colors R, G, B, and a conversion is performed based upon these histograms in such a manner that the pixel levels of this image data will be spread widely over the full range 0–255 (divided into 0th to 15th stages in the second embodiment for the sake of convenience) of possible output. Examples of these histograms are shown in FIGS. 7A–7C. These histograms are obtained by the CPU 1 in dependence upon image data and are stored in the histogram area 303 of RAM 3. Since the image data in the second embodiment is composed of eight bits for each of R, G and B, the data has values of 256 levels, namely 0 to 255, for each color. However, in order to simplify the description of the histogram examples shown in FIGS. 7A–7C, the 256 levels are divided into 16 stages and the number of pixels per stage is indicated. In FIGS. 7A–7C, (a) is a histogram of the R (red) component and indicates the number of pixels per level. For example, this histogram indicates that among all R-component pixels that make up the reference image, pixels having pixel values (levels 0 to 15) in the 0th stage are zero in number and pixels having pixel values (levels 16 to 31) in the 1st stage are one in number. FIGS. 7(b) and (c) similarly illustrate histograms of the G (green) and B (blue) components, respectively.

In regard to the histogram of each color shown in FIGS. 7A–7C, a prescribed value (number of pixels) is predetermined as a threshold value and serves as information for creating a conversion table. The conversion table is created in such a manner that a range of pixel values which possess numbers of pixels that exceed this threshold value is broadened to the full range of levels 0–255 (divided into the 0th to 15th stages in the second embodiment) capable of being output or to a range close to this range. In the examples of the histograms shown in FIGS. 7A–7C, the threshold value is "3".

Figure 8:
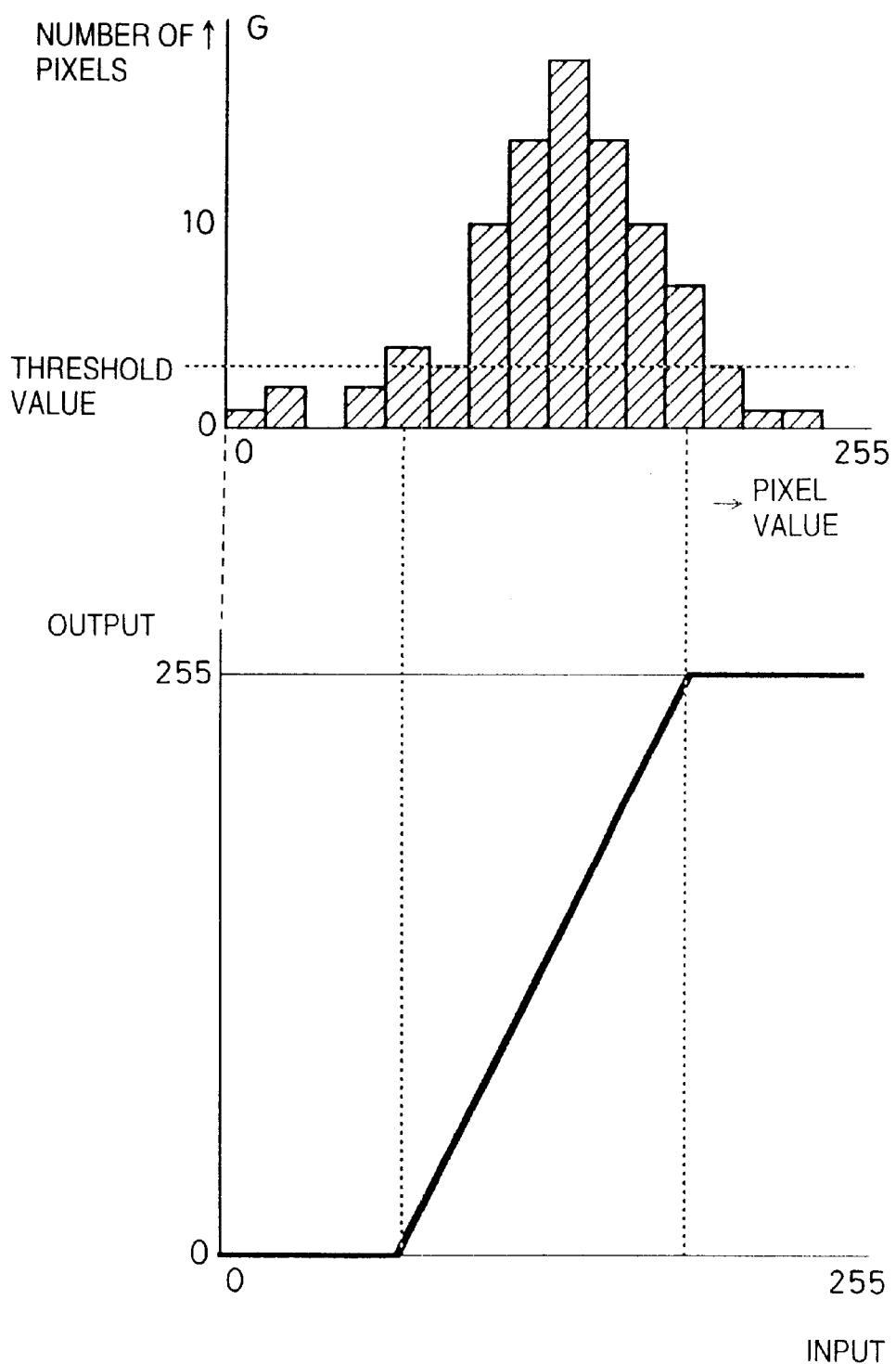
FIG. 8 is a diagram showing an example of a basic conversion table in the second embodiment.

FIG. 8 illustrates an example of a conversion table created in the second embodiment. This conversion table is created separately for each of the colors R, G and B. FIG. 8 shows an example for the G component, the top of FIG. 8 depicting the histogram for G and the bottom showing an example of a conversion table obtained from this histogram. This conversion table is found by the CPU 1 in dependence upon the image data on a per-color basis and is stored in the conversion table area 304 of RAM 3. The pixel values of the image data are converted for each color component in accordance with this conversion table.

In the histogram for G shown at the top of FIG. 8, the range of pixel values having numbers of pixels that exceed the threshold value extends from the 4th to the 11th stages. Accordingly, the conversion table in the second embodiment is created in such a manner that the range of pixel values of the 4th to 11th stages is widened to the range of 0th to 15th stages. That is, in the image data prior to conversion, pixels having the pixel values of the 0th to 4th stages are converted to the 0th stage (level 0), which is the lowest stage, and pixels having the pixel values of the 11th to 15th stages are converted to the 15th stage (level 255), which is the highest stage. In regard to the pixels having pixel values from the 5th to the 10th stages, these are converted to values in the 1st to 14th stages by proportional calculation. In other words, the conversion table for the G component is obtained in the form of the graph shown at the bottom of FIG. 8.

Depending upon the image, there are instances where the overall color tone is offset or inclined toward a certain, specific color. For example, if the image is of a scene such as a sunset, the overall image has an orange-colored gradation. If reference is made to the histogram of this image of the sunset, often a certain pixel value will be the peak value and pixels will have an inclination toward the vicinity of this pixel value. More specifically, pixel values are inclined to be larger in the histograms for R and G and smaller in the histogram for B. If level conversion processing based upon a conversion table of the kind described above is applied to such an image, the histograms of the image after conversion will widen overall for all of R, G and B. As a consequence, the orange color that prevailed in the sunset image before conversion will take on a more bluish tinge after the conversion and, hence, the color tone after conversion will be much different.

Figure 9:
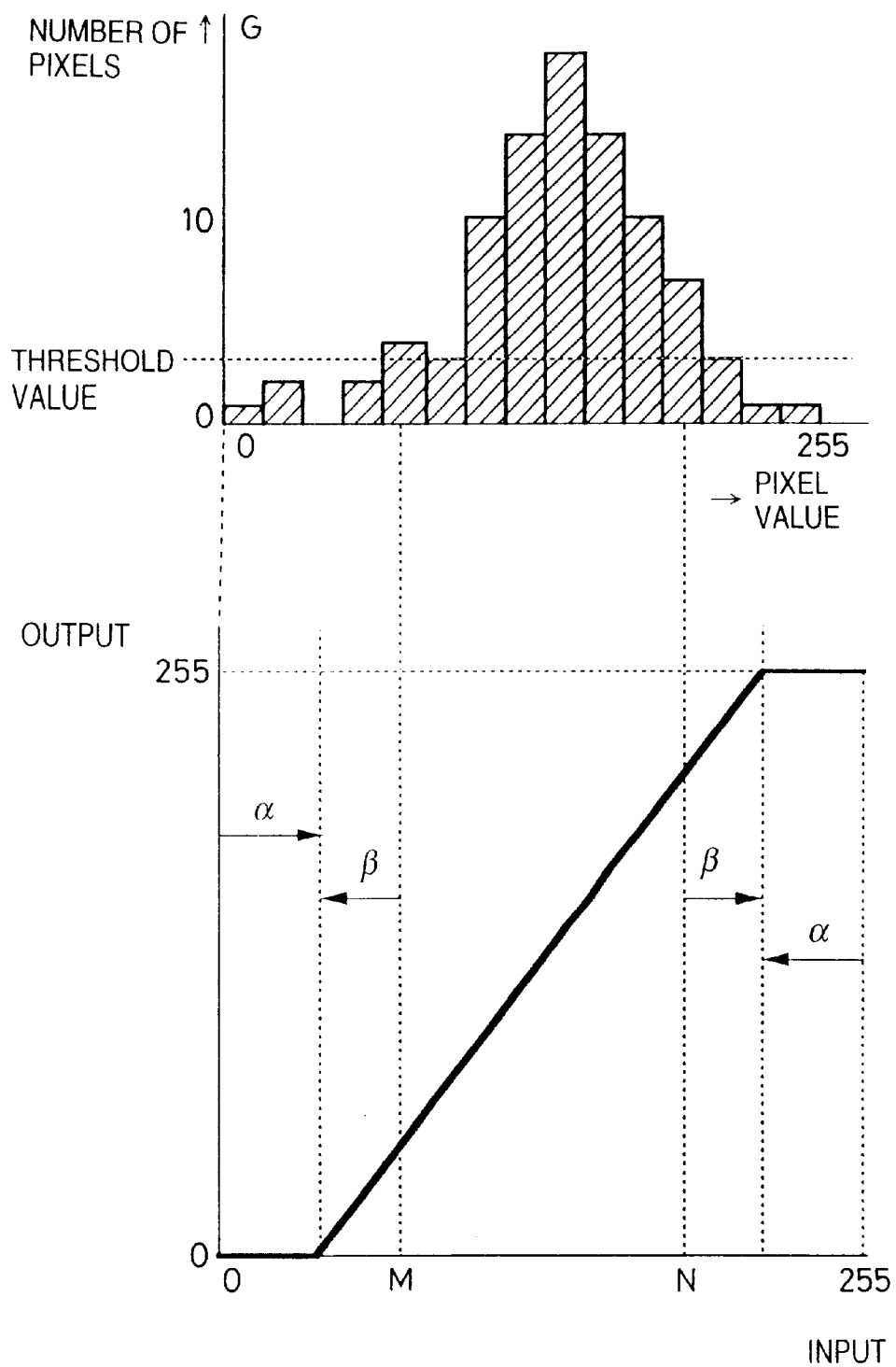
FIG. 9 is a diagram showing an example of a conversion table in the second embodiment.

In order to avoid this phenomenon in which the color tone of an image is changed by a pixel level conversion, the second embodiment imposes limits upon the range of pixel values in which a conversion is made to the fixed values of level 0 (the 0th stage) and level 255 (the 15th stage) shown in FIG. 8. Such an example is shown in FIG. 9. Here M and N represent lower and upper limits, respectively, of a histogram that exceeds a threshold value. It should be noted that constants may be given beforehand as values of $\alpha$ and $\beta$, or $\alpha$ and $\beta$ may be calculated in accordance with given functions based upon values of M and N indicating the lower and upper limits of the histogram that exceeds the threshold value. Also conceivable is a method of creating a conversion table to conform to whichever of the R, G, B histograms has the broadest range of pixel values that exceed the threshold value.

The processing for pixel level conversion in the second embodiment will now be described in detail with reference to the flowchart of FIG. 10. It should be noted that various initialization processing executed when the image application program 220, etc., is started up is omitted from this flowchart.

When the image application program 220 is started up by the CPU 1 in the second embodiment, the image application program 220 and color tone conversion program 223 for converting pixel level are read out of the ROM 2. However, in order not to make wasteful use of memory, it is preferred that the pixel level conversion program 223 be read out at such time that level conversion processing has been started from the image application program 220. Further, though various information and storage areas necessary when the level conversion processing of the second embodiment is executed are acquired in the RAM 3, the target image data area 302, histogram area 303 and conversion table area 304 may be acquired when the apparatus is started up. However, it is preferred that these areas be acquired when each is required. By adopting this expedient, memory areas are not used wastefully. This is useful in a case where other processing using memory areas is executed concurrently. Likewise, the area 305 used for other processing and as a work area in the RAM 3 may be acquired in advance when the image application program 220 is started up or when this storage area becomes necessary.

Figure 10:
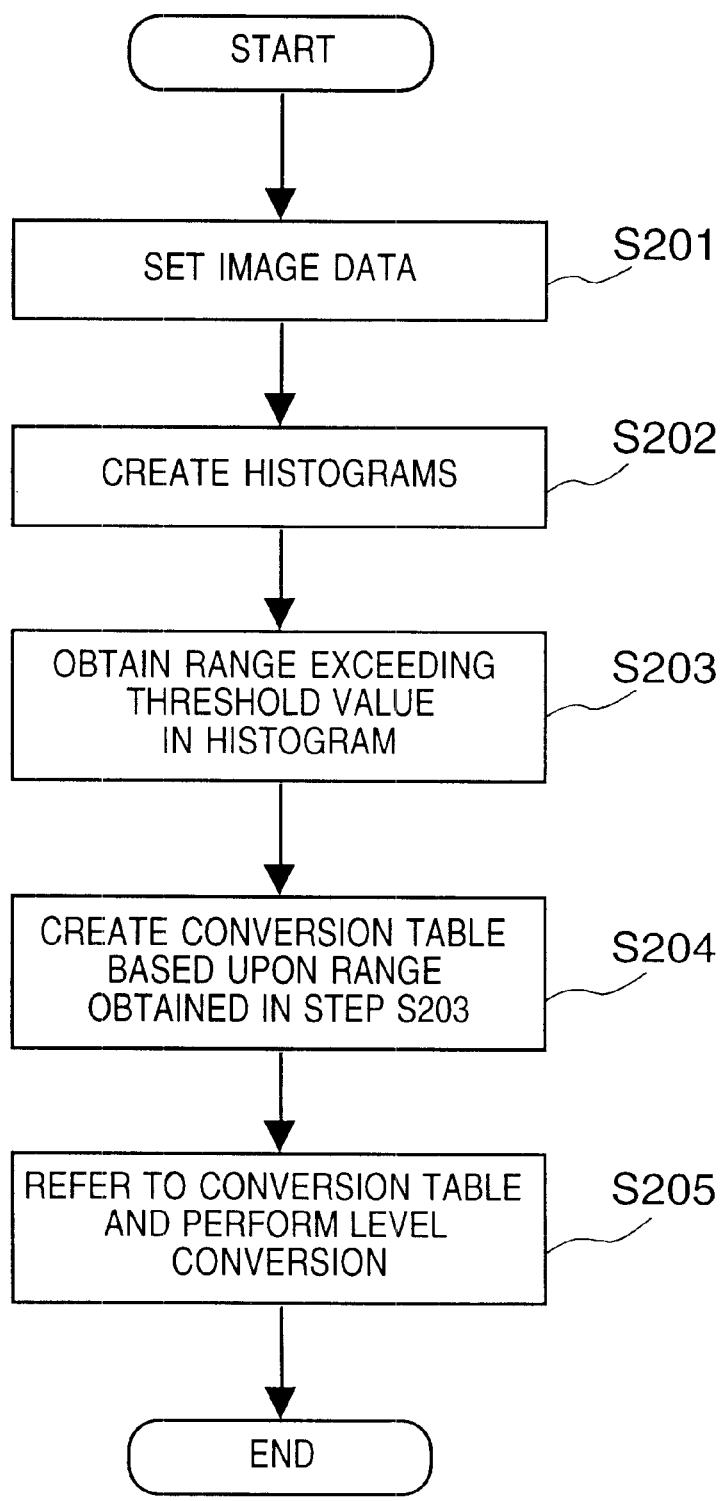
FIG. 10 is a flowchart showing level conversion processing in the second embodiment.

In the flowchart of FIG. 10, image data to undergo a pixel level conversion is called to the image data area 302 at step S201. It should be noted that the calling of the image data in the second embodiment may be performed by displaying image data of a plurality of images stored on the external storage device 7, for example, on the display unit 6 and having the user select the desired images from these displayed images by the keyboard 4 or mouse 5. Naturally, file names may be entered directly using the keyboard.

When the start of pixel level conversion processing based upon the image application program 220 is commanded in accordance with execution of the image application program 220, histograms of the image data are created at step S202. These histograms are obtained by evaluating the values (0 to 255) of all pixels of each of R, G and B and finally counting the numbers of pixels of each and every pixel value, as shown in FIGS. 7A–7C.

This is followed by step S203, at which a range of pixel values (levels) having numbers of pixels greater than a threshold value is obtained in the histogram created at step S202 for each of the colors R, G, B. More specifically, the number of pixels of level 0 (the 0th stage in the second embodiment), which is the lowest level, is obtained. If this number of pixels exceeds the threshold value, then the lower limit of the sought pixel value range becomes level 0. If the number of pixels of level 0 is equal to or less than the threshold value, on the other hand, the number of pixels of level is obtained and this is compared with the threshold value in similar fashion. This comparison operation is repeated until a level having a number of pixels that exceeds the threshold value appears, and the level for which the number of pixels exceeds the threshold value is adopted as the lower limit of the sought pixel value range. The lower limit corresponds to a dark point. In FIG. 9, the lower limit (dark point) of this pixel value range is represented by M. Similarly, a comparison of the threshold value and numbers of pixels is performed successively from level 255 (the 15th stage in the second embodiment), which is the highest level. If a level having a number of pixels that exceeds the threshold value appears, this level is adopted as the upper limit of the sought pixel value range. The upper limit corresponds to a highlight point. In FIG. 9, the upper limit (highlight point) of this pixel value range is represented by N. Though it is so arranged here that the threshold value is not included in the sought pixel value range, it is of course permissible to obtain a range that includes the threshold value.

Next, at step S204, a conversion table is created based upon the pixel value range found at step S203. The conversion table in the second embodiment is created in such a manner that pixel value range obtained at step S203 will be spread over the range of levels 0–255 (divided into 0th to 15th stages in the second embodiment for the sake of convenience) of possible output. However, as described above in conjunction with FIG. 9, limits indicated by range $\alpha$ and range $\beta$ are imposed on the conversion to levels 0 and 255.

The ranges of $\alpha$ and $\beta$ can be obtained as follows, by way of example: If the ranges of 0 to M and N to 255 are greater than a predetermined value, e.g., (total number of levels)/(8), the width of $\alpha$ is set to (total number of levels)/(8). If the range M to N is less than (total number of levels)×¾, the width of $\beta$ is set to (total number of levels)/(8). By thus setting a pixel value range in which a conversion is made to levels other than the fixed values of levels 0 and 255, it is possible to avoid a situation in which color tone after level conversion will not change greatly from color tone prior to the level conversion. The conversion table is then created in accordance with the conversion equation given by the graph at the bottom of FIG. 9.

Conversion of all pixel values of the image data is performed at step S205 in accordance with the conversion tables created at step S204. More specifically, while referring to the conversion tables, the pixels values of all pixels constituting the image data are rewritten for all color components. In the example of the G component shown in FIG. 9, an original pixel value is converted to level 0 if it falls within any of levels 0 to M and to level 255 if it falls within any of levels N to 255. All other original pixel values are converted to values that are in accordance with the conversion tables.

By thus converting all pixel values making up image data in accordance with the conversion tables created at step S204, the range of pixel values in the image data resulting from the conversion will have a spread larger than that of the original image data. This makes it possible to obtain an image, such as an image having better contrast, that has been subjected to an appropriate level adjustment automatically.

Though the second embodiment has been described in regard to an example in which low- and high-luminance portions of an image are converted to the fixed values of level 0 and level 255, the fixed values are not limited to those of this example. Any fixed values may be used so long as they are suitable values of low- and high-luminance levels, such as lower- and upper-limit values of a range of levels over which output is possible.

In the second embodiment, the same range $\alpha$ is used for determining limits within fixed levels (0 and 255, for instance), both in the high-luminance (highlight) area and in the low-luminance (dark) area as shown in FIG. 9; however, the present invention is not limited to this, and different ranges $\alpha 1$ and $\alpha 2$ may be used in the low- and high-luminance areas, respectively, depending upon characteristics of a target image.

<Modification of Second Embodiment>

The second embodiment has been described in regard to an example in which pixel values resulting from a conversion are made level 0 or level 255 unconditionally in a region of levels having numbers of pixels equal to or less than a threshold value in a histogram. In such case, however, the color tone of a region of levels (a portion where luminance is low or high) having numbers of pixels equal to or less than the threshold value in the original image is lost. As a consequence, when a range of levels having numbers of pixels equal to or less than the threshold value is wide, pixel values are lost over multiple stages and the inevitable result is that the features of the original image are lost.

Figure 11:
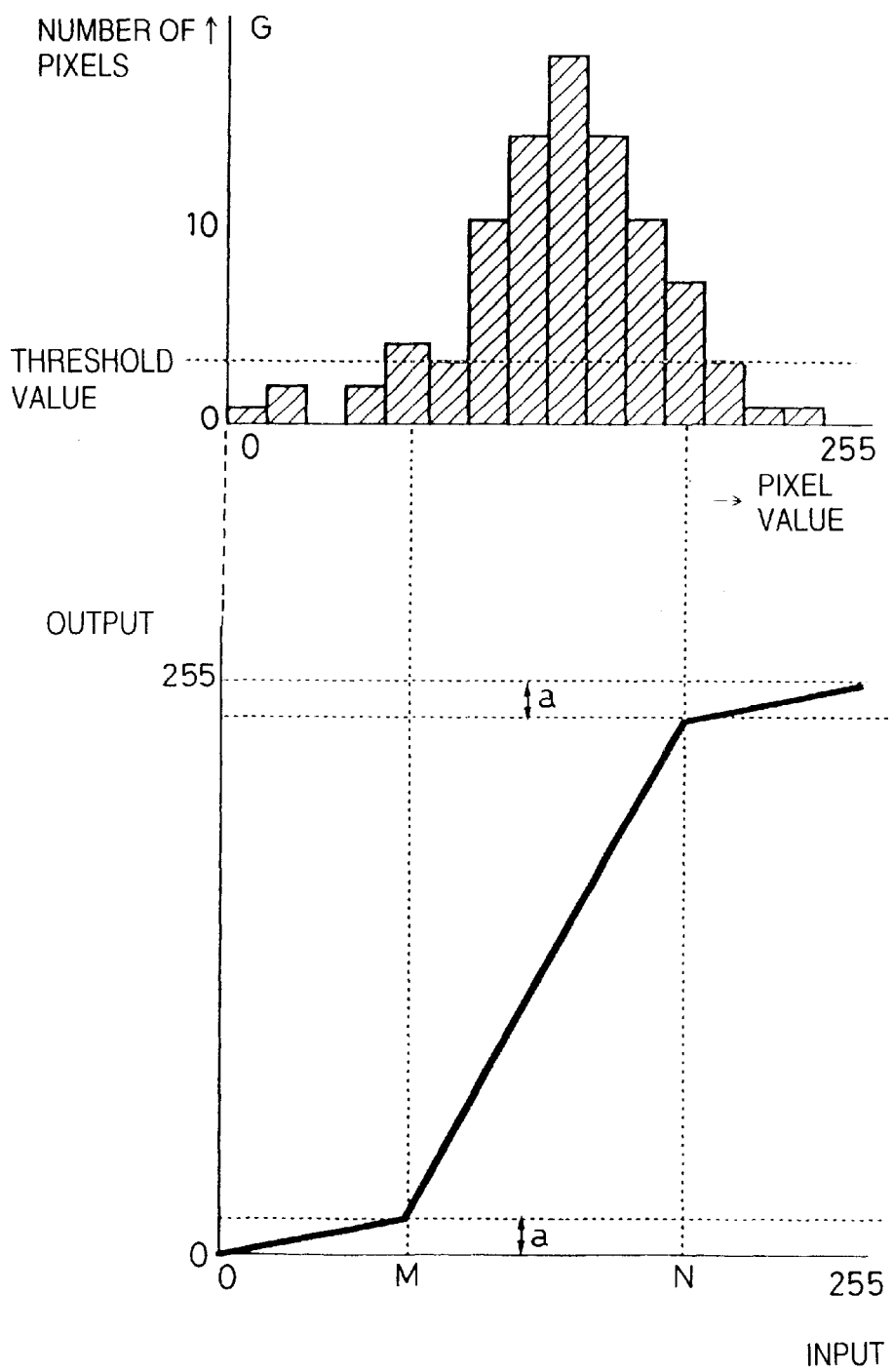
FIG. 11 is a diagram showing an example of a conversion table in the second embodiment.

An effective way to avoid this is to create a conversion table of the kind shown in FIG. 11 in accordance with the second embodiment. As shown in FIG. 11, converted pixel values in a region of levels having numbers of pixels equal to or less than the threshold value are not fixed to level 0 or 255 but are instead converted by a function provided with a certain degree of slope. By way of example, the slope a in FIG. 11 is given by a=M/2. The slope may thus be given by a simple equation. It should be noted that the value of slope a can be changed for the high- and low-luminance areas.

This makes it possible to avoid complete loss of information (color tone) in a range of levels having numbers of pixels equal to or less than the threshold value.

Figure 12:
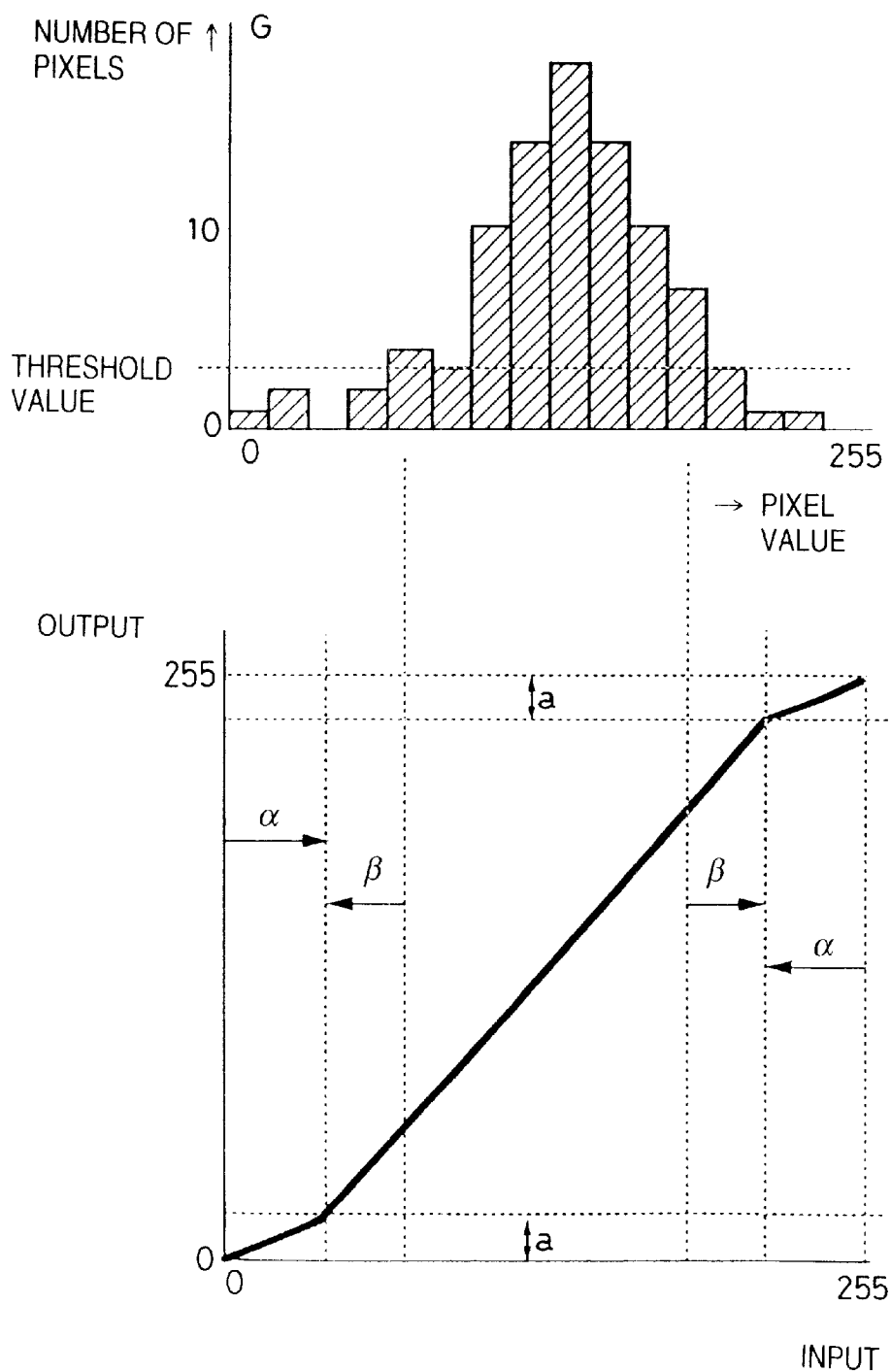
FIG. 12 is a diagram showing an example of a conversion table in the second embodiment.

The technique described in conjunction with FIG. 11 can be applied also to the conversion table shown in FIG. 9. Such an example is illustrated in FIG. 12. Specifically, as shown in FIG. 12, limits indicated by $\alpha$ and $\beta$ are imposed with respect to conversion to the fixed values of level 0 and 255, and a conversion table having a certain degree of slope is created in regard to a region of levels having numbers of pixels equal to or less than the threshold value. By creating a conversion table in this manner, information possessed by pixels having pixel values near levels 0 and 255 is prevented from being lost and it is possible also to prevent a large change in color tone.

In the second embodiment, it is stated that histograms and conversion tables are created for respective ones of the colors R, G, B. However, another conceivable method is to obtain a histogram regarding the luminance of image data and create a conversion table for luminance levels. In accordance with such method, there will be little change in color tone due to level conversion and it is possible to perform a conversion that improves only contrast.

Further, the second embodiment has been described in regard to an example in which color image data is subjected to a level conversion. However, it goes without saying that the present invention is applicable to monochromatic image data as well. That is, it is possible to make a conversion to more suitable contrast by creating a histogram and conversion table for the luminance components of the image data.

The second embodiment has been described in regard to an example in which a conversion table is obtained by a linear function (a proportional calculation). However, a non-linear function such as a gamma function may also be used.

Thus, in accordance with the second embodiment as described above, a conversion can be performed automatically in such a manner that a level such as the contrast of image data is rendered more appropriate. At such time it is possible to suppress a change in the color tone of the original image as well as loss of information in low- or high-luminance areas.

<Other Embodiments>

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention as described above, image data can be subjected to an appropriate level conversion automatically.

As many apparently widely different embodiments of the present invention can be made without departing from the spirit and scope thereof, it is to be understood that the invention is not limited to the specific embodiments thereof except as defined in the appended claims.

In a case where the present invention is applied to the aforesaid storage medium, the storage medium stores program codes corresponding to the flowcharts (FIG. 4, FIG. 10) described in the embodiments.

What is claimed is:

1. An image processing method for combining a first image with a second image, comprising:

an analysis step, of analyzing first image data, indicating the first image, consisting of a plurality of color components, and obtaining distributions of the respective color components in the first image;

a conversion condition generating step, of obtaining a corresponding conversion condition of the respective color components based upon the relationship of the distributions of the respective color components;

a conversion step, of converting each of a plurality of color components indicating the second image, of which second image data consists, using the corresponding conversion condition of the respective color components; and a combination step, of combining the first image with the second image converted in said conversion step, wherein the first image is not transformed using the corresponding conversion condition.

2. The method according to claim 1, further comprising:

a first input step of inputting the first image data; and a second input step of inputting the second image data.

3. The method according to claim 1, wherein a histogram of pixel levels in the first image data is created for each color component at said analysis step.

4. An image processing method comprising:

an analysis step, of analyzing a pixel level distribution in first image data, wherein a histogram of pixel levels in the first image data is created for each color component at said analysis step;

a conversion condition generating step, of generating conversion conditions for second image data based upon results of analysis performed at said analysis step, wherein conversion conditions for converting color tone in the first image data are generated at said conversion condition generating step, and a conversion table for converting pixel levels of the first image data is created for each color component at said conversion condition generating step; and a conversion step, of converting the second image data based upon the conversion conditions, wherein said conversion condition generating step includes, a distribution calculation step, of obtaining a distribution of each color component based upon the histogram created at said analysis step;

a maximum-distribution color determination step, of determining, as a maximum-distribution color, a color component that has the maximum distribution among the distributions of the respective color components; and a table creation step, of creating, in regard to color components other than that of the maximum-distribution color, conversion tables conforming to respective ones of the distributions and the distribution of the maximum-distribution color.

5. The method according to claim 4, wherein conversion tables are created at said table creation step in such a manner that a pixel level V' resulting from conversion will satisfy the equation $$V' = V \times \text{SUM}/\text{MAX}$$

where V represents the pixel level before conversion, SUM the distribution of said color component and MAX the distribution of the maximum-distribution color.

6. The method according to claim 4, wherein conversion tables are created at said table creation step in such a manner that pixel levels are converted non-linearly.

7. The method according to claim 6, wherein conversion tables are created at said table creation step using a gamma function.

8. The method according to claim 4, wherein pixel levels are not converted in regard to the maximum-distribution color at said conversion step.

9. An image processing apparatus for combining a first image with a second image, comprising:

analysis means for analyzing first image data, indicating the first image, consisting of a plurality of color components, and obtaining distributions of respective color components in the first image;

conversion condition generating means for obtaining a corresponding conversion condition of the respective color components based upon the relationship of distributions of respective color components;

conversion means for converting each of a plurality of color components indicating the second image, of which second image data consists, using the corresponding conversion condition of the respective color components; and combination means for combining the first image with second image converted by said conversion means, wherein the first image is not transformed using the corresponding conversion condition.

10. The apparatus according to claim 9, further comprising:

display means for displaying a plurality of images;

designating means for designating any of the plurality of images displayed on said display means; and input means for inputting image data, which represents the images designated by said designating means, as the first and second image data.

11. A recording medium on which program code of image processing for combining a first image and a second image has been recorded, said program code comprising:

code of an analysis step of analyzing first image data, indicating the first image, consisting of a plurality of color components, and obtaining distributions of respective color components in the first image;

code of a conversion condition generating step of obtaining a corresponding conversion condition of the respective color components based upon the relationship of distributions of respective color components;

code of a conversion step of converting each of a plurality of color components indicating the second image, of which second image data consists, using the corresponding conversion condition of the respective color components; and code of a combination step of combining the first image with second image converted in said conversion step, wherein the first image is not transformed using the corresponding conversion condition.

* * * * *

UNITED STATES PATENT AND TRADEMARK OFFICE
CERTIFICATE OF CORRECTION

PATENT NO. : 6,463,172 B1
DATED : October 8, 2002
INVENTOR(S) : Megumi Yoshimura It is certified that error appears in the above-identified patent and that said Letters Patent is hereby corrected as shown below:

Drawings,
Sheet 1, FIG. 1, "HISTOGARAM" should read -- HISTOGRAM --.

Column 4,
Line 7, "(a)" should read -- FIG. 2A --;
Line 12, "FIGS. 2(b) and (c)" should read -- FIGS. 2B and 2C --; and
Line 37, "is" should read -- is created --.

Column 8,
Line 31, "(a)" should read -- FIG. 7A --; and
Line 37, "FIGS. 7(b) and (c)" should read -- FIGS. 7B and 7C --.

Column 12,
Line 46, "foregoing" (second occurrence) should be deleted.

Signed and Sealed this

Nineteenth Day of August, 2003

JAMES E. ROGAN
*Director of the United States Patent and Trademark Office*